United States Patent [19]

Adair et al.

[11] Patent Number: 4,751,102

[45] Date of Patent: Jun. 14, 1988

[54] RADIATION-CURABLE INK AND COATING COMPOSITIONS CONTAINING IONIC DYE COMPOUNDS AS INITIATORS

[75] Inventors: Paul C. Adair, Springboro; Michael J. Moore, Dayton, both of Ohio

[73] Assignee: The Mead Corporation, Dayton, Ohio

[21] Appl. No.: 77,911

[22] Filed: Jul. 27, 1987

[51] Int. Cl.[4] .............................................. B05D 3/06
[52] U.S. Cl. .................................. 427/53.1; 427/54.1; 430/339; 522/25; 522/26; 522/31; 522/50; 522/63
[58] Field of Search ............................. 427/53.1, 54.1; 430/339; 522/25, 26, 31, 50, 63

[56] References Cited

U.S. PATENT DOCUMENTS

| | | |
|---|---|---|
| 3,567,453 | 3/1971 | Borden ................................ 430/339 |
| 3,933,509 | 1/1976 | Noguchi et al. ..................... 430/281 |
| 4,307,182 | 12/1981 | Dalzell et al. ....................... 430/339 |
| 4,343,891 | 8/1982 | Aasen et al. ........................ 430/339 |
| 4,447,521 | 5/1984 | Tiers et al. .......................... 430/339 |
| 4,450,227 | 5/1984 | Holmes et al. ..................... 430/339 |

Primary Examiner—John H. Newsome
Attorney, Agent, or Firm—Smith & Schnacke

[57] ABSTRACT

The present invention provides radiation-curable ink compositions comprising pigment and a photohardenable composition; the photohardenable composition comprises a free radical addition polymerizable or crosslinkable compound and an ionic dye-reactive counter ion compound which is capable of absorbing actinic radiation and producing free radicals which initiate free radical polymerization or crosslinking of the polymerizable or crosslinkable compound.

20 Claims, No Drawings

RADIATION-CURABLE INK AND COATING COMPOSITIONS CONTAINING IONIC DYE COMPOUNDS AS INITIATORS

BACKGROUND OF THE INVENTION

The present invention relates to novel radiation-curable ink and coating compositions, and more particularly, to radiation-curable ink and coating compositions containing an ionic dye-reactive counter ion complex as a photoinitiator.

Radiation-curable ink compositions are widely used. Compared to solvent-based ink compositions, radiation-curable ink compositions are advantageous because toxicological and environmental concerns are avoided. U.S. Pat. Nos. 3,661,614; 4,003,868; and 4,215,167, teach ultraviolet-curable ink compositions. These compositions comprise a polymerizable material such as a monomer, an initiator system, and a pigment or a dye.

While the most common examples of radiation curable inks are sensitive to ultraviolet radiation or blue light, compositions which are sensitive to longer wavelengths of visible light such as longer wavelength blue, red or green light would be desirable. Ultraviolet-sensitive photoinitiators often are suitable for cyan and magenta ink compositions because cyan and magenta pigments absorb little near ultraviolet or blue light. However, ultraviolet-sensitive photoinitiators are generally undesirable for yellow compositions because yellow pigments and dyes absorb strongly in the near ultraviolet-blue region. As such, yellow ultraviolet-curable ink compositions cure more slowly or require higher intensity radiation than cyan or magenta ultraviolet-curable ink compositions. Inks with a large yellow components, such as brown, black, green, or red also cure more slowly.

In addition to inks, there are other applications in which radiation curable compositions containing a colorant are useful. In particular, in coating paper, paperboard, and other sheet materials, such compositions are useful. They are also useful in printing simulated wood coatings.

SUMMARY OF THE INVENTION

The present invention provides a radiation-curable ink and coating composition comprising a pigment or a dye and a photohardenable composition. The photohardenable composition comprises a free radical addition polymerizable or crosslinkable compound and an ionic dye-reactive counter ion compound.

It has been found that ionic dye-reactive counter ion compounds, such as cationic dye-borate anion compounds, are useful photoinitiators of free radical addition reactions. Such compounds consist of a visible light absorber (the ionic dye) ionically bonded to a reactive counter ion. The counter ion is reactive in the sense that upon excitation of the dye, the counter ion donates an electron to or accepts an electron from the excited dye. This electron transfer process generates radicals capable of initiating polymerization of a monomer.

The mechanism whereby the compounds absorb energy and generate free radicals is not entirely clear. It is believed that upon exposure to actinic radiation, the dye ion is excited to a singlet state in which it accepts an electron from or donates an electron to the counter ion. For a cationic dye-borate anion compound, this can be illustrated by the following equation:

$$BR_4^- D^+ \rightarrow D + BR_4$$

The lifetime of the dye singlet state is extremely short by comparison to the lifetime of the triplet state. The quenching rate constants which have been observed suggest that the ionic compounds experience a very efficient electron transfer via the singlet state. In solution in the polymerizable compound, tight ionic pairing of the counter ion and the dye is believed to provide favorable spacial distribution promoting electron transfer to such an extent that the transfer occurs even though the lifetime of the singlet state is very short. Of course, this does not mean that electron transfer is restricted to the singlet state. Ionic dyes which have significant populations of triplet state may undergo electron transfer through the singlet state, triplet state, or both singlet and triplet states.

Upon transfer of the electron, a radical is formed. Many of the ionic compounds used as initiators in the present invention do not appear to exhibit back electron transfer. It is believed that following electron transfer, the dye and counter ion become disassociated such that back electron transfer does not occur.

The ionic compounds used in the present invention are different than the collision generated species encountered in other photosensitive systems such as collision complexes which yield encounter complexes, exciplexes and/or contact ion pairs. See for example, Kavarnos et al., "Photosensitization by Reversible Electron Transfer", *Chem. Rev.* 401(1986).

In accordance with the present invention, the ionic dye and the counter ion are present in the photopolymerizable composition as a stable, non-transient compound, and not as a dissociated ion pair. Formation of the compound is not dependent upon diffusion and collision. As distinguished from photographic materials and compositions containing collision dependent complexes, essentially all of the sensitizing dye present in the photosensitive materials of the present invention prior to exposure is ionically bonded to the counter ion.

The ionic compounds used as initiators in the present invention can also be characterized in that they are soluble in nonpolar solvents such as trimethylolpropane triacrylate (TMPTA) and the like. They are soluble in an amount of at least about 0.1%, and preferably, at least about 0.3% by weight. While these amounts are not large, they are substantial considering the normally lower solubility of ionic materials in polar solvents. While the compounds are soluble, the dye and the counter ion do not dissociate in solution. They remain ionically bonded to each other.

In dye-sensitized photopolymerizable compositions, visible light is absorbed by a dye having a comparable absorption band, the dye is raised to its excited electronic state, the lifetime of which may be $10^{-9}$ to $10^{-3}$ second, depending upon the nature (singlet or triplet) of the excited state. During this time, absorbed energy in the form of an electron must be transferred to or from the dye molecule to produce the free radical. In prior initiator systems, this transfer is diffusion controlled. The excited dye must interact (collide) with another molecule in the composition which quenches the dye and generates a free radical. In the present invention, the transfer is not diffusion (collision) controlled. Electron transfer occurs at greater than diffusion controlled rates. In terms of Stern-Volmer kinetics, this means the quenching constant (Kq) of the excited dye is greater than $10^{10}$, and more particularly, greater than $10^{12}$. At these rates, electron transfer can occur through the singlet state.

As mentioned earlier, there is a tendency for yellow pigments and dyes to absorb strongly in the near ultraviolet-blue region. The present invention provides radiation-curable compositions which are sensitive at longer wavelengths in which the yellow pigment or dye does not absorb. The compositions of the present invention can contain any color pigment or dye including white, black, yellow, magenta, or cyan pigments or dyes but they are particularly useful as yellow compositions.

One of the particular advantages of using ionic dye-reactive counter ion compounds as initiators is the ability to select from a wide variety of dyes which absorb at substantially different wavelengths. The absorption characteristics of the compound are principally determined by the dye. Thus, by selecting a dye which absorbs at 400 nm or greater, the sensitivity of the compositions can be extended well into the visible range.

In accordance with the present invention, a radiation-curable ink or coating composition comprising a colorant, a free radical addition polymerizable or crosslinkable compound and an ionic dye-reactive counter ion compound is provided. The ionic dye-reactive counter ion compound is capable of absorbing actinic radiation and producing free radicals which initiate free radical polymerization or crosslinking of the polymerizable or crosslinkable compound.

In accordance with more particular embodiments of the invention, the ionic compound is a cationic dye-borate anion compound, and still more particularly, a cyanine dye-borate anion compound or an anionic dye compound such as ionic compounds of xanthene dyes with iodonium or pyryllium ions.

Another embodiment of the present invention resides in a method of coating or printing wherein a radiation-curable composition is coated or printed on a substrate and exposed to actinic radiation.

Other objects and advantages of the present invention will become apparent from the following description and appended claims.

DETAILED DESCRIPTION OF THE INVENTION

The radiation-curable compositions of the present invention contain a colorant and a photohardenable composition wherein the photohardenable composition contains a free radical addition polymerizable or crosslinkable compound and an ionic dye-reactive counter ion compound.

Cationic dye-borate anion compounds are known in the art. Their preparation is described in U.S. Pat. Nos. 3,567,453; 4,307,182; 4,343,891; 4,447,521; and 4,450,227. The compounds used in the present invention can be represented by the general formula (I):

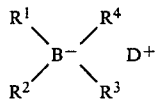

where $D^+$ is a cationic dye; and $R^1$, $R^2$, $R^3$, and $R^4$ are independently selected from the group consisting of alkyl, aryl, alkaryl, allyl, aralkyl, alkenyl, alkynyl, alicyclic, and saturated or unsaturated heterocyclic groups.

Useful dyes form photoreducible but dark stable complexes with borate anions and can be cationic methine, polymethine, triarylmethane, indoline, thiazine, xanthene, oxazine, and acridine dyes. More specifically, the dyes may be cationic cyanine, carbocyanine, hemicyanine, rhodamine, and azomethine dyes. In addition to being cationic, the dyes should not contain groups which would neutralize or desensitize the complex or render the complex poorly dark stable. Examples of groups which generally should not be present in the dye are acid groups such as free carboxylic or sulphonic acid groups.

Specific examples of useful cationic dyes are Methylene Blue, Safranine O, Malachite Green, cyanine dyes of the general formula (II), and rhodamine dyes of the formula (III):

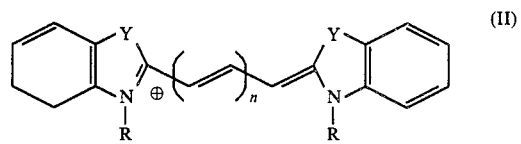

$n = 0, 1, 2, 3,$
$R = alkyl$
$Y = CH=CH, N-CH_3, C(CH_3)_2, O, S, Se$

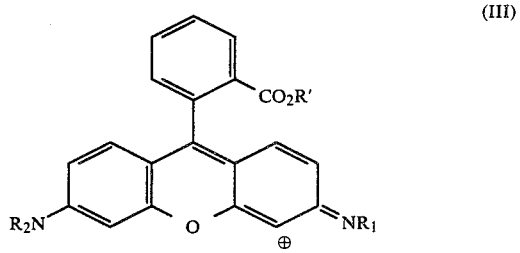

$R'$, $R =$ alkyl, aryl, and any combination thereof.

While they have not been tested, the cationic cyanine dyes disclosed in U.S. Pat. No. 3,495,987 should be useful in the present invention.

The borate anion is designed such that the borate radical generated upon exposure to light and after electron transfer to the dye (Eq. 1) readily dissociates with the formation of a radical as follows:

For example, particularly preferred anions are triphenylbutylborate and trianisylbutylborate anions because they readily dissociate to triphenylborane or trianisylborane and a butyl radical. On the other hand, tetrabutylborate anion does not work well presumably because the tetrabutylborate radical is not stable and it readily accepts an electron back from the dye in a back electron transfer and does not dissociate efficiently. Likewise, tetraphenylborate anion is very poor because the phenyl radical is not easily formed.

Preferably, at least one but not more than three of $R^1$, $R^2$, $R^3$, and $R^4$ is an alkyl group. Each of $R^1$, $R^2$, $R^3$, and $R^4$ can contain up to 20 carbon atoms, and they typically contain 1 to 7 carbon atoms. More preferably, $R^1$-$R^4$ are a combination of alkyl group(s) and aryl group(s) or aralkyl group(s), and still more preferably, a combination of three aryl groups and one alkyl group.

Representative examples of alkyl groups represented by $R^1$–$R^4$ are methyl, ethyl, propyl, butyl, pentyl, hexyl, octyl, stearyl, etc. The alkyl groups may be substituted, for example, by one or more halogen, cyano, acyloxy, acyl, alkoxy, or hydroxy groups.

Representative examples of aryl groups represented by $R^1$–$R^4$ include phenyl, naphthyl, and substituted aryl groups such as anisyl. Alkaryl groups include methylphenyl, dimethylphenyl, etc. Representative examples of aralkyl groups represented by $R^1$–$R^4$ groups include benzyl. Representative alicyclic groups include cyclobutyl, cyclopentyl, and cyclohexyl groups. Examples of an alkynyl group are propynyl and ethynyl, and examples of alkenyl groups include a vinyl group.

As a general rule, useful ionic dye compounds must be identified empirically; however, potentially useful dye and counter ion combinations can be identified by reference to the Weller equation (Rehm, et al., *Isr. J. Chem.* 8, 259 (1970), which can be simplified as follows.

$$\Delta G = E_{ox} - E_{red} - Eh \qquad (Eq. 3)$$

where $\Delta G$ is the change in the Gibbs free energy, $E_{ox}$ is the oxidation potential of the borate anion $BR_4^-$, $E_{red}$ is the reduction potential of the cationic dye, and $E_{h\nu}$ is the energy of light used to excite the dye. Useful compounds will have a negative free energy change. Similarly, the difference between the reduction potential of the dye and the oxidation potential of the borate must be negative for the compounds to be dark stable, i.e., $E_{ox} - E_{red} > 0$.

As indicated, Eq. 2 is a simplification and it does not absolutely predict whether a compound will be useful in the present invention or not. A number of other factors will influence this determination. One such factor is the effect of the monomer on the compound. Another factor is the radial distance between the ions. It is also known that if the Weller equation produces too negative a value, deviations from the equation are possible. Furthermore, the Weller equation only predicts electron transfer, and does not predict whether a particular compound is an efficient initiator of polymerization. The equation is a useful first approximation.

Specific examples of cationic dye-borate anion compounds useful in the present invention are shown in the following table with their $\lambda$ max.

TABLE

| Compound No. | Structure | $\lambda$ max (TMPTA) |
| --- | --- | --- |
| 1. | (benzothiazole dye with CH₃-substituted trimethine bridge, N-ethyl groups) $Ph_3B^\ominus n\text{-}C_4H_9$ | 552 nm |
| 2. | (benzothiazole trimethine dye, N-C₇H₁₅ groups) $Ph_3B^\ominus n\text{-}C_4H_9$ | 568 nm |
| 3. | (benzoxazole trimethine dye, N-n-C₆H₁₃ groups) $Ph_3B^\ominus n\text{-}C_4H_9$ | 492 nm |
| 4. | (benzothiazole monomethine dye, N-CH₃ groups) $Ph_3B^\ominus n\text{-}C_4H_9$ | 428 nm |
| 5. | (methylene blue-type dye, (CH₃)N— and —N(CH₃)₂, S⊕) $Ph_3B^\ominus n\text{-}C_4H_9$ | 658 nm |

TABLE-continued

| 6. | [structure: diazine dye with two CH₃, two NH₂ groups, N-phenyl cation] | 528 nm |

Ph₃B⊖n-C₄H₉

| 7. | [structure: bis-thiazine cyanine dye with N-ethyl groups] | 450 nm |

Ar₃B⊖—R'

| No. | R' | Ar |
|---|---|---|
| 7A | n-butyl | phenyl |
| 7B | n-hexyl | phenyl |
| 7C | n-butyl | anisyl |

| 8. | [structure: indolenine trimethine cyanine dye] | 550 nm |

Ar³—B⊖—R'

| No. | R' | R | Ar |
|---|---|---|---|
| 8A | methyl | n-butyl | phenyl |
| 8B | methyl | n-hexyl | phenyl |
| 8C | n-butyl | n-butyl | phenyl |
| 8D | n-butyl | n-hexyl | phenyl |
| 8E | n-heptyl | n-butyl | phenyl |
| 8F | n-heptyl | n-hexyl | phenyl |
| 8G | ethyl | n-butyl | phenyl |

| 9. | [structure: benzothiazole trimethine cyanine with N-C₇H₁₅ groups] | 570 nm System |

+

(CH₃O—C₆H₄—)₃B̄—C₄H₉

| 10. | [structure: benzoxazole pentamethine cyanine with N-ethyl groups] | 590 nm System |

+

(CH₃O—C₆H₄—)₃B̄—C₄H₉

TABLE-continued 11. 640 nm

| No. | R | R' | Ar |
| --- | --- | --- | --- |
| 11A | methyl | n-butyl | phenyl |
| 11B | methyl | n-hexyl | phenyl |
| 11C | n-butyl | n-butyl | phenyl |
| 11D | n-butyl | n-hexyl | phenyl |
| 11E | n-pentyl | n-butyl | phenyl |
| 11F | n-pentyl | n-hexyl | phenyl |
| 11G | n-heptyl | n-butyl | phenyl |
| 11H | n-heptyl | n-hexyl | phenyl |
| 11I | methyl | n-butyl | anisyl |

12. 740 nm System

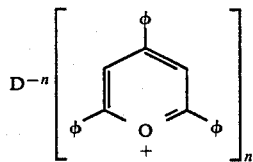

The cationic dye-borate anion compounds can be prepared by reacting a borate salt with a dye in a counterion exchange in a known manner. See Hishiki, Y., *Repts. Sci. Research Inst.* 29, 72 (1953). Useful borate salts are sodium salts such as sodium tetraphenyl- borate, sodium triphenylbutylborate, sodium trianisylbutylborate, and ammonium salts such as tetraethylammonium tetraphenylborate.

Anionic dye compounds are also useful in the present invention. Anionic dye-iodonium ion compounds of the formula (IV):

$$[R^5-I-R^6]_n D^{-n} \quad (IV)$$

where $D^-$ is an anionic dye and $R^5$ and $R^6$ are independently selected from the group consisting of aromatic nucleii such as phenyl or naphthyl and n is 1 or 2; and anionic dye-pyryllium compounds of the formula (V):

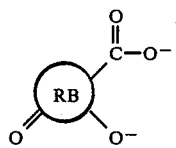

(V)

where $D^-$ and n are as defined above are typical examples of anionic dye complexes.

Representative examples of anionic dyes include xanthene and oxonol dyes. For example, Rose Bengal, eosin, erythrosin, and fluorescein dyes are useful. In addition to iodonium and pyryllium ions, other compounds of anionic dyes and sulfonium and phosphonium cations are potentially useful.

As in the case of the cationic dye compoudns useful dye-cation combinations can be identified through the Weller equation as having a negative free energy.

Selected examples of anionic dye compounds are shown in Table 2 (λmax. ca. 570 nm in TMPTA). In Table 2, the symbol φ is used for a phenyl group and the structure

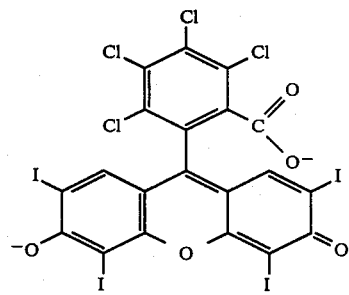

is used for

TABLE 2

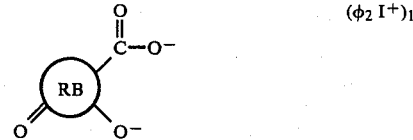

$(\phi_2 I^+)_1$

TABLE 2-continued

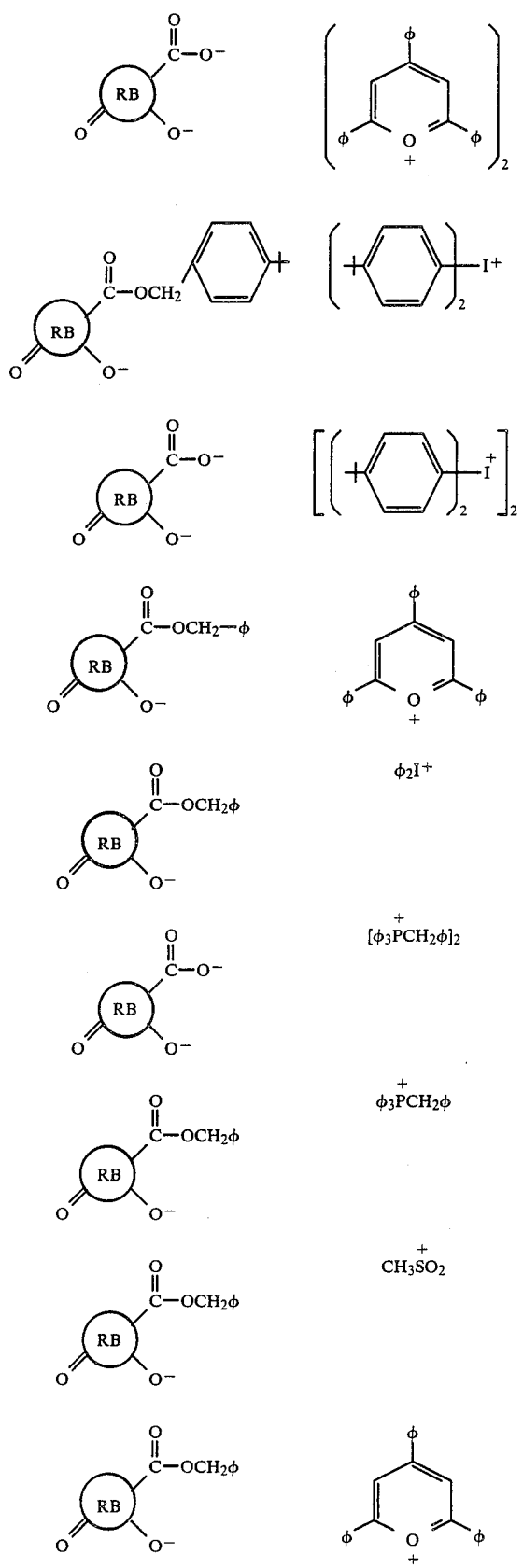
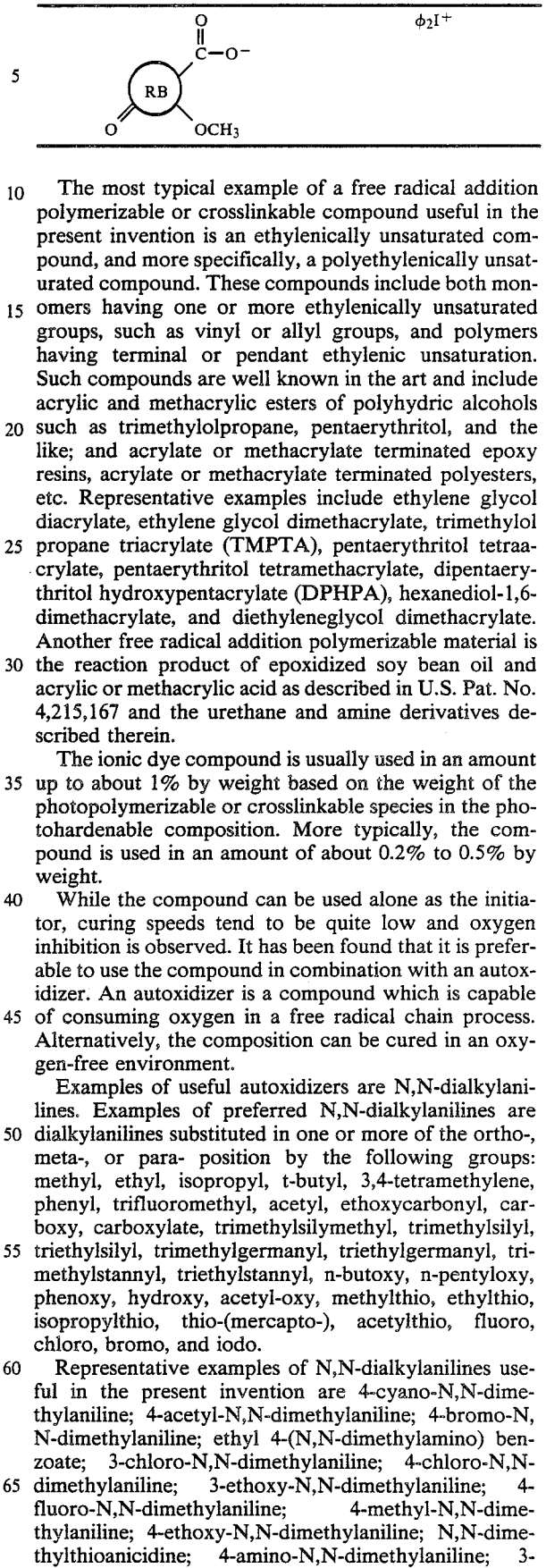

The most typical example of a free radical addition polymerizable or crosslinkable compound useful in the present invention is an ethylenically unsaturated compound, and more specifically, a polyethylenically unsaturated compound. These compounds include both monomers having one or more ethylenically unsaturated groups, such as vinyl or allyl groups, and polymers having terminal or pendant ethylenic unsaturation. Such compounds are well known in the art and include acrylic and methacrylic esters of polyhydric alcohols such as trimethylolpropane, pentaerythritol, and the like; and acrylate or methacrylate terminated epoxy resins, acrylate or methacrylate terminated polyesters, etc. Representative examples include ethylene glycol diacrylate, ethylene glycol dimethacrylate, trimethylol propane triacrylate (TMPTA), pentaerythritol tetraacrylate, pentaerythritol tetramethacrylate, dipentaerythritol hydroxypentacrylate (DPHPA), hexanediol-1,6-dimethacrylate, and diethyleneglycol dimethacrylate. Another free radical addition polymerizable material is the reaction product of epoxidized soy bean oil and acrylic or methacrylic acid as described in U.S. Pat. No. 4,215,167 and the urethane and amine derivatives described therein.

The ionic dye compound is usually used in an amount up to about 1% by weight based on the weight of the photopolymerizable or crosslinkable species in the photohardenable composition. More typically, the compound is used in an amount of about 0.2% to 0.5% by weight.

While the compound can be used alone as the initiator, curing speeds tend to be quite low and oxygen inhibition is observed. It has been found that it is preferable to use the compound in combination with an autoxidizer. An autoxidizer is a compound which is capable of consuming oxygen in a free radical chain process. Alternatively, the composition can be cured in an oxygen-free environment.

Examples of useful autoxidizers are N,N-dialkylanilines. Examples of preferred N,N-dialkylanilines are dialkylanilines substituted in one or more of the ortho-, meta-, or para- position by the following groups: methyl, ethyl, isopropyl, t-butyl, 3,4-tetramethylene, phenyl, trifluoromethyl, acetyl, ethoxycarbonyl, carboxy, carboxylate, trimethylsilymethyl, trimethylsilyl, triethylsilyl, trimethylgermanyl, triethylgermanyl, trimethylstannyl, triethylstannyl, n-butoxy, n-pentyloxy, phenoxy, hydroxy, acetyl-oxy, methylthio, ethylthio, isopropylthio, thio-(mercapto-), acetylthio, fluoro, chloro, bromo, and iodo.

Representative examples of N,N-dialkylanilines useful in the present invention are 4-cyano-N,N-dimethylaniline; 4-acetyl-N,N-dimethylaniline; 4-bromo-N,N-dimethylaniline; ethyl 4-(N,N-dimethylamino) benzoate; 3-chloro-N,N-dimethylaniline; 4-chloro-N,N-dimethylaniline; 3-ethoxy-N,N-dimethylaniline; 4-fluoro-N,N-dimethylaniline; 4-methyl-N,N-dimethylaniline; 4-ethoxy-N,N-dimethylaniline; N,N-dimethylthioanicidine; 4-amino-N,N-dimethylaniline; 3- hydroxy-N,N-dimethylaniline; N,N,N',N'-tetramethyl-1,4-dianiline; 4-acetamido-N,N-dimethylaniline, etc.

Preferred N,N-dialkylanilines are substituted with an alkyl group in the ortho-position and include 2,6-diisopropyl-N,N-dimethylaniline; 2,6-diethyl-N,N-dimethylaniline; N,N,2,4,6-pentamethylaniline (PMA); and p-t-butyl-N,N-dimethylaniline.

The autoxidizers are preferably used in the present invention in concentrations of about 4-5% by weight.

Synthesis Examples 1 and 2 respectively illustrate the preparation of borates and dye-borate compounds.

SYNTHESIS EXAMPLE 1

Dissolve triphenylborane in 150 ml dry benzene (1M) under nitrogen atmosphere. Place flask in a cool water bath and, while stirring, add n-BuLi, (1.1 eg.) via syringe. A white precipitate soon formed after addition was started. Stirring is continued about 45-60 min. Dilute with 100 ml hexane and filter, washing with hexane. This resultant Li salt is slightly air unstable. Dissolve the white powder in about 200 ml distilled water and, with vigorous stirring, add aqueous solution of tetramethyl ammonium chloride (1.2 eg. of theoretical in 200 ml). A thick white precipitate forms. Stir this aqueous mixture about 30 min. at room temperature, then filter. Wash collected white solid with distilled water.

As an alternative synthesis, to a 1.0M solution of 2.0 equivalents of 1-butene in dry, oxygen-free dichloromethane, under inert atomosphere, was added slowly dropwise with stirring, 1.0 equivalents of a 1.0M solution of dibromethane-methylsulfide complex in dichloromethane. The reaction mixture stirred at reflux for 36 hours and the dichloromethane and excess 1-butene were removed by simple distillation. Vacuum distillation of the residue afforded 0.95 equivalents of a colorless mobile oil (Bp 66-7 0.35 mm Hg, "BNMR;bs (4.83PPM). Under inert atmosphere, this oil was dissolved in dry, oxygen-free tetrahydrofuran to give a 1.0M solution and 3.0 equivalents of a 2.0M solution of phenylmagnesium chloride in tetrahydrofuran were added dropwise with stirring. After stirring 16 hours, the resultant solution was added slowly with vigorous stirring to 2 equivalents of tetramethylammonium chloride, as a 0.2 M solution, in water. The resulting white flocculate solid was filtered and dried to afford a near quantitative amount of the desired product Mp 250°-2° C., " BNMR;bs (−3.70PPM).

SYNTHESIS EXAMPLE 2

Sonicate a suspension of a borate salt (1 g/10 ml) in MeOH, to make a very fine suspension. Protect flask from light by wrapping with aluminum foil then add 1 equivalent of dye. Stir this solution with low heat on a hot plate for about 30 min. Let cool to room temperature then dilute with 5-10 volumes of ice water. Filter the resultant solid and wash with water until washings are colorless. Suction filter to dryness. Completely dry initiator compound by low heat (about 50° C.) in a vacuum drying oven. Initiator is usually formed quantitatively. Analysis by H-NMR indicates 1:1 compound formation typically greater than 90%.

Conventional colorants can be used in conventional amounts in the radiation-curable ink compositions of the present invention. Suitable colorants include dyes and pigments such as carbon black, zinc oxide, titanium dioxide, benzidine yellow, hansa yellow, naphthol yellow lake, cadmium orange, cadmium yellow, chrome yellow, Prussian blue, bronze blue, chrome green, peacock blue lake, milori blue, ultramarine blue, red lake C, para red, toluidine red, sodium lithol red, barium lithol red, lithol rubine, molybdated scarlet chrome, ferric oxide, and aluminum hydrate. The colorant is used in amounts of about 5 to 80% by weight of the light-curable ink composition depending on the application.

It should be understood that the ionic dye-reactive counter ion compound selected will depend upon the colorant used. In other words, an ionic dye-reactive counter ion compound is selected which absorbs within a certain visible light wavelength region in which the particular colorant chosen preferably absorbs little, if any, visible light. Since the ionic dye compound absorbs at greater than 400 nm, it is colored, but the compound tends to be present in small amounts and it usually does not detract from the color of the colorant. There are applications, however, where the color of the ionic dye-reactive counter ion may be undesirable, for example, where the coating composition is white. In this case, it is desirable to select a photobleachable ionic dye compound. These ionic dye compounds are initially colored but are bleached upon exposure to radiation.

Known modifiers can be incorporated into the radiation-curable compositions of the present invention. Such modifiers include plasticizers; wetting agents for the pigment such as dichloromethylstearate and other chlorinated fatty acids; and leveling agents such as lanolin, paraffin waxes, and natural waxes such as cerise wax and carbauba wax. Such modifiers are generally used in amounts of about 1 to 3% by weight of the light-curable compositions. In order to improve the cure efficiency, a thiol could be added to the light-curable ink composition.

A three roll mill, a sand mill, a ball mill, a colloid mill, etc. may be used to mix the compositions. It should be understood that after preparation of the visible light-curable compositions of the present invention, the compositions are stored in light-tight containers or handled in a light-tight manner to prevent premature visible light exposure.

The light-curable compositions are used in a conventional manner. For example, the light-curable ink composition can be coated or printed on a substrate. The thickness of the composition can be varied as desired. Conventional coating techniques such as spray, curtain, dip, pad, roll-coating, and brushing can be used. Conventional printing techniques can be used.

The light-curable compositions can be applied by printing or coating to any conventional substrate. Examples of useful substrates include wood; metal, such as foils, cans, and bottle caps: glass; rubber; fabric, such as cotton, silk, and rayon; paper; newsprint; coated paper stock; corrugated board; fiber; plastic film: and molded plastic. They are useful in providing a variety of finishes including a simulated wood finish.

If the light-curable ink compositions are to be coated on a substrate, the substrate can be pretreated or primed as desired prior to the coating of the light-curable ink compositions thereon. Similarly, if the light-curable ink compositions are to be printed on a substrate, the substrate can be pretreated in any conventional manner prior to the printing of the light-curable ink compositions thereon.

The light-curable compositions are then exposed to visible light to cure the compositions. The actual exposure time required depends on a number of variables such as coating weight, coating thickness, the photohardenable composition, and the distance between the light source and the light-curable ink compositions.

The present invention is more fully illustrated by the following non-limiting Examples.

EXAMPLE 1

A yellow, light curable ink was produced by dissolving 3.0g of Disperse Yellow 42 (Aldrich) dye in 100g of trimethylolpropane triacrylate (Sartomer). This solution was divided into two equal portions. To portion A was added 1.0g of isopropylthioxanthone (Ward-Blenkinsop). To portion B was added 0.1g of N,N'-dibutylindocarbocyanine triphenylbutylborate. Both portions A and B were heated to 85° C. for 30 minutes and then cooled to room temperature. To each portion was added 1.0g of 2,6-diisopropyl-N,N-dimethylaniline. One drop of each was placed between two microscope slides and exposed to the light from one fluorescent tube at a distance of 12 centimeters. The times for first notable photopolymerization and for full slide immobilization were noted. Portion B exhibited polymerization at 26 seconds and slide immobilization at 32 seconds. Portion A exhibited no polymerization within 2½ minutes. Thus, in 0 the presence of a visible light initiator ($\lambda$max approx. 550 nm), Portion B polymerized much more rapidly than Portion A, which contained a highly efficient UV ($\lambda$max=390 nm) initiator.

EXAMPLE 2

A yellow, light curable ink was produced by adding 12g of Quinoline Yellow pigment (Aldrich) to 100g of trimethylolpropane triacrylate (Sartomer). This mixture was divided into two equal portions. To portion A was added 1.0 g of isopropylthioxanthone (Ward-Blenkinsop). To portion B was added 0.1 g of N,N'-diheptylindocarbocyanine triphenylbutylborate. Both portions were heated to 85° C. for 30 minutes and then cooled to room temperature. To each portion was added 1.0 g of 2,6-diisopropyl-N,N-dimethylaniline. Several drops of each portion were placed on a 3 mil PET sheet and placed in a glass exposure frame. The samples were flushed with argon for ten minutes and then exposed for 15 seconds with two fluorescent tubes at a distance of 12cm with continuous flush. Portion B droplets, which contained the green sensitive initiator, fully polymerized. Portion A, which contained an efficient UV initiator ($\lambda$max=390 nm), polymerized only at the droplet surface, remaining liquid below that surface.

Having described the invention in detail and by reference to preferred embodiments thereof, it will be apparent that modifications and variations are possible without departing from the scope of the invention defined in the appended claims

What is claimed is:

1. A radiation-curable composition comprising a colorant, a free radical addition polymerizable or crosslinkable compound, and an ionic dye-reactive counter ion compound, said ionic dye-reactive counter ion compound being capable of absorbing actinic radiation and producing free radicals which initiate free radical polymerization or crosslinking of said polymerizable or crosslinkable compound.

2. The composition of claim 1 wherein prior to exposure, said ionic dye-reactive counter ion compound is a stable, non-transient compound.

3. The composition of claim 2 wherein following exposure of said ionic dye-reactive counter ion compound to light, an electron is transferred from said dye to said counter ion or from said counter ion to said dye and the rate of said electron transfer is greater than a diffusion controlled rate.

4. The composition of claim 3 wherein said ionic dye-reactive counter ion compound is represented by the formula

where D+ is a cationic dye; and $R^1$, $R^2$, $R^3$, and $R^4$ are independently selected from the group consisting of alkyl, aryl, alkaryl, allyl, aralkyl, alkenyl, alkynyl, alicyclic, and saturated or unsaturated heterocyclic groups.

5. The composition of claim 4 wherein said cationic dye is a cyanine dye.

6. The composition of claim 1 wherein said compound is an anionic dye compound.

7. The composition of claim 6 wherein said anionic dye is selected from the group consisting of xanthene and oxonol dyes.

8. The composition of claim 1 wherein said polymerizable or crosslinkable compound is an ethylenically unsaturated compound.

9. The composition of claim 6 wherein said ionic dye-reactive counter ion compound is an anionic dye-iodonium ion complex or an anionic dye-pyryllium ion complex.

10. The composition of claim 9 wherein said dye is a xanthene dye.

11. A method of coating or printing comprising the steps of:
coating or printing on a substrate with a radiation-curable ink composition comprising a colorant, a free radical addition polymerizable or crosslinkable compound, and an ionic dye-reactive counter ion compound, said ionic dye-reactive counter ion compound being capable of absorbing actinic radiation and producing free radicals which initiate free radical polymerization or crosslinking of said polymerizable or crosslinkable compound; and
exposing said coated or printed substrate to actinic radiation.

12. The method of claim 11 wherein prior to exposure, said ionic dye-reactive counter ion compound is a stable, non-transient compound.

13. The method of claim 12 wherein following exposure of said ionic dye-reactive counter ion compound to radiation, an electron is transferred from said dye to said counter ion or from said counter ion to said dye and the rate of said electron transfer is greater than a diffusion controlled rate.

14. The method of claim 13 wherein said ionic dye-reactive counter ion compound is represented by the formula

where D+ is a cationic dye; and $R^1$, $R^2$, $R^3$, and $R^4$ are independently selected from the group consisting of alkyl, aryl, alkaryl, allyl, aralkyl, alkenyl, alkynyl, alicyclic, and saturated or unsaturated heterocyclic groups.

15. The method of claim 14 wherein said cationic dye is a cyanine dye.

16. The method of claim 11 wherein said ionic dye-reactive counter ion compound is an anionic dye complex.

17. The method of claim 16 wherein said anionic dye is a xanthene dye.

18. The method of claim 11 wherein said polymerizable or crosslinkable compound is an ethylenically unsaturated compound.

19. The method of claim 16 wherein said ionic dye-reactive counter ion compound is an anionic dye-iodonium ion compound or an anionic dye-pyryllium ion compound.

20. The method of claim 19 wherein said dye is a xanthene dye.

* * * * *